United States Patent Office 3,484,425
Patented Dec. 16, 1969

3,484,425
CATALYST FOR POLYMERIZATION OF 1,3-BUTADIENE TO CIS-1,4-POLYBUTADIENE CONSISTING OF Co AND/OR Ni PERCHLORATE PLUS AN ORGANOMETALLIC COMPOUND OF GROUPS I–III OF THE PERIODIC TABLE
Takeshi Yamawaki and Masakatsu Usami, Tokyo, Japan, assignors to Mitsubishi Chemical Industries, Ltd., Tokyo, Japan
No Drawing. Filed Jan. 30, 1968, Ser. No. 701,543
Claims priority, application Japan, Feb. 6, 1967, 42/7,282
Int. Cl. C08d 1/14, 3/08; B01j 11/84
U.S. Cl. 260—94.3          17 Claims

ABSTRACT OF THE DISCLOSURE

An improvement of polymerization of 1,3-butadiene in which 1,3-butadiene is polymerized in the presence of a catalyst consisting of nickel perchlorate and/or cobalt perchlorate and an organo-metallic compound of a metal of Groups I–III of the Periodic Table.

---

This invention relates to the polymerization of 1,3-butadiene, and particularly to the preparation of cis-1,4-polybutadiene.

Polybutadiene produced from 1,3-butadiene is useful in automobile tires because of its resilience, abrasion resistance, low heat build up and good thermal stability. Particularly, a polybutadiene containing a high percentage of polymer having a cis-1,4 structure is superior in thermal and mechanical properties. Prior to this invention, it has been found that butadiene can be polymerized by various catalyst combinations of transition metal salts and organometallic compounds.

It has been also found that catalyst systems having particular transition metal components lead the polymerization to cis-1,4-polybutadiene; when titanium is selected as transition metal component, it is necessary to combine iodine with titanium, but the cis-1,4-content attained by using this catalyst never exceeds about 92 or 93 percent, and moreover it is not economical to use such a particular salt; when cobalt or nickel is selected as the transition metal, a three-component catalyst consisting of naphthenate of cobalt or nickel, alkyl aluminum compound and BF₃ is proposed and a high cis-1,4 content of about 95 percent is attained with this catalyst, but it has no catalytic activity if BF₃ is omitted, the use of which makes the catalyst preparation somewhat complicated and is not advantageous from the industrial point of view; a cobalt chloride-containing catalyst was also proposed, in which the organo-metallic compounds to be combined with cobalt chloride are limited only to a few particular compounds, that is, when aluminum trialkyl is combined therewith, the polymer obtained has 1,2-syndiotactic structure without aging of the catalyst.

It has been found now that the above-mentioned disadvantages are overcome, when using a new catalyst comprising the product formed by mixing at least one perchlorate selected from the group consisting of nickel perchlorate and cobalt perchlorate with an organo-metallic compound of a metal of Groups I–III of the Periodic Table.

The catalyst is prepared by mixing and reacting the perchlorate and the organo-metallic compound preferably in a suitable solvent. The polymerization of 1,3-butadiene is carried out in the presence of such catalyst under a wide range of reaction conditions. As perchlorate of nickel and cobalt employed in this invention nickel (II) perchlorate and cobalt (II) perchlorate are preferred, since they are easily available and are more stable than nickel (III) and cobalt (III) perchlorates. The perchlorates may contain more than two moles of water of crystallization per mole. Usually the commercial perchlorates contain about six moles of water of crystallization, which can be removed partially by heating before the preparation of the catalyst but it is impossible to obtain a perchlorate containing less than two moles of water of crystallization, since it tends to explode. The dehydration is carried out at a temperature of 70° C. to 150° C. Of course, these perchlorates can be used in the form of a mixture. The organo-metallic compounds to be mixed with the perchlorate may be selected from a wide range of compounds, which is one of the most important features of this invention, and they have the formula

wherein R is an alkyl, an aryl or a cycloalkyl radical, M is a metal of Groups I–III of the Periodic Table, X is hydrogen or halogen, $m$ is 1 to 3, $n$ is 0 to 2, and $m+n$ is equal to the valence of the metal M.

The preferred organo-metallic compounds are those of aluminum, boron, zinc, magesium, cadmium, and lithium.

The most preferred organo-metallic compounds are alkyl aluminum compounds and alkyl zinc compounds of the formula

wherein R is an alkyl radical having 1 to 8 carbon atoms, M is zinc or aluminum, X is chlorine, bromine or iodine, $m$ and $n$ are the same as above, $m+n$ is 2 or 3.

Particularly, triethyl aluminum, diethyl aluminum chloride, ethyl aluminum sesquichloride, monoethyl aluminum dichloride, tri-isopropyl aluminum, tri-n-butyl aluminum, tri-isobutyl aluminum, trioctyl aluminum, diethyl zinc and mixtures thereof are suitable.

The solvent employed in the preparation of the catalyst must not affect the catalyst and the polymerization of 1,3-butadiene, and may be an aromatic hydrocarbon such as benzene, toluene or xylene; an aliphatic hydrocarbon such as n-hexane, n-heptane; a cycloaliphatic hydrocarbon such as cyclohexane, methyl cyclohexane; a halogenated hydrocarbon such as chlorobenzene, dichloroethane; a mixture of hydrocarbons such as petroleum ether or ligroine; and mixtures thereof.

In preparing the catalyst in accordance with this invention, the catalyst can be formed by only mixing the perchlorate with the organo-metallic compound in the presence of the inert solvent, and it possesses polymerization activity without any aging immediately after mixing. The order of addition of the catalytic components and the solvent is not critical.

Thus, the perchlorate and the organo-metallic compound are added to the solvent in that order, or vice versa. The presence of 1,3-butadiene or its polymer during preparation of the catalyst does not interfere with the reaction of the catalyst components; therefore, the catalyst may be prepared in 1,3-butadiene or its polymer with or without any solvent.

Generally the catalyst is prepared at room temperature in the presence of the inert solvent under an atmosphere of dry inert gas, such as nitrogen and argon. However, the temperature may be selected from −40° to 100° C. The proportion of catalyst components may be varied over a wide range. In general it is preferred to select proportions of the organo-metallic compound and the perchlorate such as to provide in the catalyst a molar ratio of the metal of the organo metallic compound to the metal of the perchlorate from 0.01:1 to 100:1, preferably from 0.2:1 to 20:1.

The catalyst thus formed by mixing of the components is usually a slurry containing unreacted perchlorate which remains insoluble in the catalyst system and is preferably removed by filtration, decantation, sedimentation, centrifugation and the like. The liquid phase thus separated from the unreacted perchlorate, which may contain some colloidal recation products, can be used as the catalyst.

It is not always essential to prepare the catalyst prior to the polymerization but the components of the catalyst may be introduced separately into the polymerization system to form the catalyst therein. Butadiene is introduced into the system in the form of liquid or gas. The solvent is preferably the same as that used in the preparation of the catalyst, but the use of the solvent is not always necessary. The catalyst, butadiene and solvent, if necessary, are introduced together with or separately from each other.

The polymerization is carried out over a wide temperature range, generally from $-40°$ to $100°$ C. and preferably from $0°$ to $60°$ C., and under atmospheric or elevated pressure. A small amount of catalyst is enough for the polymerization; in general the amount used is from $10^{-5}$ to 10 mol percent and preferably $10^{-2}$ to 5 mol percent as the perchlorate based on 1,3-butadiene. Polybutadiene is recovered from the reaction mixture according to conventiional procedure. For example, the solvent and unreacted 1,3-butadiene are distilled off to obtain polybutadiene. A non-solvent for polybutadiene, for example alcohols and ketones, may be poured into the reaction mixture to precipitate and to recover the polybutadiene. Polybutadienes obtained in accordance with this invention have cis-1,4-contents of more than about 85%, and even 98% or a higher cis-1,4-content is attained under suitable conditions.

Preferred embodiments of this invention will be illustrated by the means of examples. It should be understood, however, that the examples are given only for explanation and are not intended to limit the scope of this invention.

EXAMPLE 1

Into a 200 ml. pressure glass bottle was charged 100 ml. of dried toluene and 1 millimole of nickel (II) perchlorate, which was prepared by dehydrating the commercial perchlorate having 6 moles of water of crystallization at 140° C. for 5 hours to reduce the water of crystallization to 2 moles, and then 0.5 millimole of triisobutyl aluminum was added under a stream of nitrogen.

Subsequently, 0.44 mole of 1,3-butadiene was added and the bottle was hermetically sealed. Polymerization was carried out for 20 hours while the bottle was rotated in a water bath maintained at 45° C.

After completion of the polymerization, 500 ml. of methanol containing 0.1% of phenyl-β-naphthyl amine as anti-oxidant was added to the reaction mixture, and, the rubber polymer precipitated was recovered and dried.

The yield of polymer thus obtained was 94% and 90% of the polymer possessed 1,4-cis structure as determined by its infrared spectrum. The intrinsic viscosity in toluene was 2.05.

EXAMPLE 2

The same procedures as in Example 1 were repeated except that 1 millimole of cobalt (II) perchlorate dehydrated at 140° C. for 5 hours was employed instead of the nickel (II) perchlorate. The yield of polymer was nearly 100%. The percentage of 1,4-cis structure was 89.3% and the intrinsic viscosity was 1.92.

EXAMPLE 3

The same procedures as in Example 1 were repeated, but 1.5 millimoles of diethyl aluminum chloride were substituted for the tributyl aluminum. The yield was nearly 100%, the percentage of cis-1,4 structure was 83.9% and the intrinsic viscosity was 0.85.

EXAMPLE 4

4 millimoles of commercially available nickel (II) perchlorate, dehydrated at 140° C. for 5 hours, and 1.5 millimoles of tributyl aluminum were added to 100 ml., of toluene, then the mixture was shaken and solid materials were removed by filtration. The liquid phase so produced was charged into a 200 ml. pressure glass bottle, 0.4 mole of 1,3-butadiene was added, and the bottle was sealed. The bottle was maintained in a water bath at 15° C. for 20 hours to polymerize the 1,3-butadiene.

After completion of the reaction, 500 ml. of methanol containing 0.1% of phenyl-β-naphthylamine was added to the reaction mixture to precipitate a rubbery polymer which was vacuum dried at 50° C. The yield of the product was 90.0%, the content of cis-1,4-structure was 91.7% and the intrinsic viscosity was 1.1.

EXAMPLE 5

A catalyst was prepared according to the same procedures as in Example 4 except that 1.5 millimoles of triethyl aluminum were employed instead of the triisobutyl aluminum. To the separated liquid phase was added 0.4 mole of 1,3-butadiene, and the mixture was reacted for 20 hours in a pressure glass bottle at 45° C. The yield of the product was 90.2%, the content of cis-1,4 structure was 89.0% and the intrinsic viscosity was 1.2.

EXAMPLE 6

Into a 200 ml. glass pressure bottle was charged 100 ml. of dried toluene and 3.5 millimoles of nickel (II) perchlorate dehydrated at 140° C. for 5 hours and then 1.5 millimole of diethyl zinc dissolved in n-hexane was added. To the mixture was added 0.44 millimole of 1,3-butadiene at $-25°$ C.

The bottle was sealed and rotated at 15° C. for 20 hours to polymerize the butadiene.

The yield of polymer was 87.0%, the content of cis-1,4 structure was 92.7% and the intrinsic viscosity was 0.5.

EXAMPLE 7

100 ml. of dried chlorobenzene as solvent, 3.4 millimoles of nickel (II) perchlorate previously dehydrated at 140° C. for 5 hours and 1.5 millimoles of triisobutyl aluminum were mixed to prepare a catalyst. The liquid phase thereof was charged into a 200 ml. pressure glass bottle and cooled to $-25°$ C.; 0.44 mole of 1,3-butadiene was charged into the bottle which was then sealed and rotated at 15° C. for 20 hours to polymerize the 1,3-butadiene. The yield of polymer was 40.0%, the content of cis-1,4 structure was 92.4% and the intrinsic viscosity was 0.7.

EXAMPLE 8

Into a 200 ml. pressure glass bottle was charged 100 ml. of dried heptane, 3.4 millimoles of nickel (II) perchlorate previously dehydrated at 140° C. for 5 hours and 1.5 millimoles of triisobutyl aluminum dissolved in a small amount of n-heptane. The bottle was then cooled to $-25°$ C., charged with 0.44 mole of 1,3-butadiene and sealed. The bottle was rotated at 15° C. for 20 hours to polymerize the 1,3-butadiene. The yield of polymer was 65.0%, the content of cis 1,4 structure was 95.9% and the intrinsic viscosity was 1.7.

EXAMPLE 9

Into a 200 ml. pressure glass bottle was charged 100 ml. of dried toluene and the bottle was cooled to $-10°$ C., and 1.5 millimoles of triisobutyl aluminum dissolved in a small amount of n-heptane and 1.7 millimoles of nickel (II) perchlorate previously dehydrated at 140° C. for 5 hours were added. Immediately thereafter the colour of the reaction system changed from light yellowish green to black brown and an exothermic reaction was started. After polymerization at 15° C. for 20 hours with rotation, the yield of the polymer was 89.0% and the content of cis-1,4 structure was 85.5%.

EXAMPLE 10

A 200 ml. pressure glass bottle was charged with 1.7 millimoles of nickel (II) perchlorate previously dehydrated at 140° C. for 5 hours and 100 ml. of dried toluene and cooled at −10° C. Then, in order, 0.44 mole of 1,3-butadiene and 1.5 millimoles of triisobutyl aluminum dissolved in a small amount of n-heptane were added.

Immediately thereafter the colour of the reaction system changed from light yellowish green to black brown and an exothermic reaction was started.

After polymerization at 15° C. for 20 hours with rotation, the yield of the polymer was 90.0% and the content of cis-1,4 structure was 86.6%.

EXAMPLE 11

The procedures described in Example 10 were repeated but 1.8 millimoles of cobalt (II) perchlorate were substituted for the nickel (II) perchlorate. The colour of the reaction system changed from light reddish violet to black brown and an exothermic reaction was started.

The yield of the polymer was 86.0% and the content of cis-1,4 structure was 94.8%.

For comparative purposes the following metal salts were substituted for the cobalt (II) perchlorate and the same procedures as above-mentioned were repeated. The results are shown in the following table.

TABLE

| Metal Salt | | Change of colour of reaction system after reaction | Yield of polymer |
|---|---|---|---|
| Kind | Amount (mmol) | | |
| $FeCl_3$ | 1.7 | Reddish brown, no change | 4 |
| $NiCl_2$ | 1.9 | Yellow to black brown, only surface. | 0 |
| $CoCl_2$ | 1.7 | Violet to light blue, only surface | [1] 61 |
| $NiSO_4$ | 7.8 | Yellowish green, no change | 0 |
| $CoSO_4$ | 7.8 | Reddish violet, no change | 6 |

[1] The resulting polymer was a liquid.

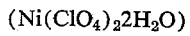

[1] The resulting polymer was a liquid.

EXAMPLE 12

8 millimoles of nickel (II) perchlorate $$(Ni(ClO_4)_2 2H_2O)$$

previously dehydrated at 140° C. and 10 millimoles of triisobutyl aluminum were admixed to 500 ml. of toluene at 20° C. with agitation. The upper liquid layer was separated and employed as catalyst. A pressure glass bottle was charged with 0.81 mole of 1,3-butadiene and the catalyst, sealed, and immersed into a water bath maintained at 20° C. for 6 hours with agitation to polymerize the 1,3-butadiene.

The reaction mass was poured into methanol-toluene containing 1% of 2,6-di-tertiarybutyl-4-methyl phenol plus phenyl-β-naphthyl amine in a molar ratio of 2:1 as antioxidant to precipitate the polybutadiene. The rubbery product so obtained was recovered and dried. The yield of polybutadiene was 70%, the content of cis-1,4- structure was 96.5% and the intrinsic viscosity was 1.6.

EXAMPLE 13

The same procedures as described in Example 12 were repeated except that 7.5 millimoles of triisobutyl aluminum were employed, and the polymerization was carried out for 10 hours. The yield of polybutadiene was 47%, the content of cis-1,4 structure was 97.3% and the intrinsic viscosity was 2.1.

EXAMPLE 14

Polybutadiene was produced according to the same procedure as in Example 12 except that the amount of triisobutyl aluminum was 5 millimoles. Then the polybutadiene was vulcanized and tested.

| | | |
|---|---|---|
| Intrinsic viscosity | | 2.4 |
| Content of cis-1,4 structure | percent | 97.2 |
| Vulcanization conditions: | | |
| Polybutadiene | parts | 100 |
| Zinc white | do | 3 |
| Sulfur | do | 1.5 |
| Stearic acid | do | 3 |
| Vulcanization accelerator (MSA) | do | 1 |
| Carbon black (SH) | | 50 |
| Temperature | ° C | 145 |
| Time | minutes | 30 |
| Properties of vulcanized rubber: | | |
| Compound Mooney viscosity (ML) | | 92.5 |
| Hardness | | 68 |
| Modulus (kg./cm.²) at— | | |
| 100% | | 31 |
| 200% | | 79 |
| 300% | | 149 |
| Tensile strength | kg./cm.² | 216 |
| Elongation at breaking | percent | 415 |
| Rebound | do | 62.3 |

We claim:

1. Polymerization catalyst, comprising the product formed by mixing at least one perchlorate selected from the group consisting of nickel perchlorate and cobalt perchlorate with an organo-metallic compound of a metal of groups I–III of the Periodic Table.

2. Polymerization catalyst, according to claim 1, in which said organo-metallic compound is an organo aluminum compound.

3. Polymerization catalyst, according to claim 1, in which said organo-metallic compound is an organo-zinc compound.

4. Polymerization catalyst, comprising the product formed by mixing at least one perchlorate selected from the group consisting of nickel perchlorate and cobalt perchlorate with an organo-metallic compound of the formula $R_mMX_n$, wherein R is an alkyl, an aryl or a cycloalkyl radical, M is a metal of Groups I–III of the Periodic Table, X is hydrogen or a halogen, $m$ is 1 to 3, $n$ is 0 to 2 and $m+n$ is equal to the valence of metal M.

5. Polymerization catalyst, comprising the product formed by mixing at least one perchlorate selected from the group consisting of nickel perchlorate and cobalt perchlorate with an organo-metallic compound of the formula $R_mMX_n$, wherein R is an alkyl, an aryl or a cycloalkyl radical, M is zinc or aluminum, X is hydrogen or halogen, $m$ is 1 to 3, $n$ is 0 to 2 and $m+n$ is 2 or 3, in proportions of said organo-metallic compound and said perchlorate such as to provide in said catalyst a molar ratio of the metal of said organo-metalic compound to the metal of said perchlorate of 0.01:1 to 100:1.

6. Polymerization catalyst, comprising the product formed by mixing at least one perchlorate selected from the group consisting of nickel perchlorate and cobalt perchlorate with an organo-metallic compound of the formula $R_mMX_n$, wherein R is an alkyl radical of 1 to 8 carbon atoms, M is zinc or aluminum, X is chlorine, bromine or iodine, $m$ is a number 1 to 3, $n$ is 0 to 2 and $m+n$ is 2 or 3, in proportions of said organo-metallic compound and said perchlorate such as to provide in said catalyst a molar ratio of the metal of said organo-metallic compound to the metal of said perchlorate of 0.01:1 to 100:1.

7. Polymerization catalyst, comprising the product formed by mixing at least one perchlorate selected from the group consisting of nickel perchlorate and cobalt perchlorate with an organo-aluminum compound selected from the group consisting of trialkylaluminum and chlorinated alkylaluminum, in proportions of said organo-aluminum compound and said perchlorate such as to provide in said catalyst a molar ratio of aluminum to the metal of said perchlorate of 0.01:1 to 100:1.

8. Polymerization catalyst according to claim 7, in which said organo-aluminum compound is triethyl aluminum.

9. Polymerization catalyst according to claim 7, in which said organo-aluminum compound is triisobutyl aluminum.

10. Polymerization catalyst according to claim 7, in which said organo-aluminum compound is tri-n-butyl aluminum.

11. Polymerization catalyst according to claim 7, in which said organo-aluminum compound is diethyl aluminum monochloride.

12. Polymerization catalyst, comprising the product formed by mixing at least one perchlorate selected from the group consisting of nickel perchlorate and cobalt perchlorate with a dialkyl zinc, in proportions of said dialkyl zinc and said perchlorate such as to provide in said catalyst a molar ratio of zinc to the metal of said perchlorate of 0.01:1 to 100:1.

13. Polymerization catalyst according to claim 12, in which said dialkyl zinc is diethyl zinc.

14. Polymerization catalyst, comprising the product formed by mixing at least one perchlorate selected from the group consisting of nickel perchlorate and cobalt perchlorate dehydrated at a temperature of 70 to 150° C. with an organometallic compound of the formula $R_mMX_n$, wherein R is an alkyl, an aryl or a cycloalkyl radical, M is a metal of Groups I–III of the Periodic Table, X is hydrogen or halogen, $m$ is 1 to 2, $n$ is a number of 0 to 2 and $m+n$ is equal to the valence of metal M.

15. Polymerization catalyst, comprising the product formed by (1) mixing at least one perchlorate selected from the group consisting of nickel perchlorate and cobalt perchlorate with an organo-metallic compound of the formula $R_mMX_n$, wherein R is an alkyl, an aryl or a cycloalkyl radical, M is a metal of Group I–III of the Periodic Table, X is hydrogen or a halogen, $m$ is 1 to 3, $n$ is 0 to 2, and $m+n$ is equal to the valence of metal M, and (2) removing the unreacted perchlorate from the resulting mixture.

16. Process for the polymerization of 1,3-butadiene to cis-1,4-polybutadiene which comprises contacting 1,3-butadiene with a catalyst as defined in claim 1 at a temperature between −40 and 100° C.

17. Process for the polymerization of 1,3-butadiene to cis-1,4-polybutadiene which comprises contacting 1,3-butadiene with a catalyst as defined in claim 1 at a temperature between −40° and 100° C., the amount of said perchlorate being $10^{-5}$ to 10 mole percent based on 1,3-butadiene.

References Cited
FOREIGN PATENTS 914,246  11/1968  Great Britain.

JOSEPH L. SCHOFER, Primary Examiner

R. A. GAITHER, Assistant Examiner

U.S. Cl. X.R.

252—429